US012059095B2

(12) United States Patent
Noordhuis

(10) Patent No.: US 12,059,095 B2
(45) Date of Patent: Aug. 13, 2024

(54) MIXING APPARATUS FOR EXAMPLE CREATING FROTHED MILK

(71) Applicant: KONINKLIJKE PHILIPS N.V., Eindhoven (NL)

(72) Inventor: Joeke Noordhuis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/030,055

(22) PCT Filed: Dec. 16, 2021

(86) PCT No.: PCT/EP2021/086145
§ 371 (c)(1),
(2) Date: Apr. 3, 2023

(87) PCT Pub. No.: WO2022/136097
PCT Pub. Date: Jun. 30, 2022

(65) Prior Publication Data
US 2023/0363577 A1 Nov. 16, 2023

(30) Foreign Application Priority Data

Dec. 21, 2020 (EP) .................................... 20216020

(51) Int. Cl.
*A47J 31/44* (2006.01)
*B01F 23/232* (2022.01)
(Continued)

(52) U.S. Cl.
CPC ....... *A47J 31/4485* (2013.01); *A47J 31/4496* (2013.01); *B01F 23/2323* (2022.01); *B01F 23/2326* (2022.01); *B01F 23/235* (2022.01)

(58) Field of Classification Search
CPC ................ A47J 31/4485; A47J 31/4489; A47J 31/4496; B01F 23/235; B01F 23/2326;
(Continued)

(56) References Cited

U.S. PATENT DOCUMENTS 10,092,131 B2 * 10/2018 Ferraro ................ A47J 31/4489
11,134,807 B2 * 10/2021 Jarisch ................ A47J 31/4489
(Continued)

FOREIGN PATENT DOCUMENTS

| CN | 101810439 A | 8/2010 |
| CN | 110022730 A | 7/2019 |

(Continued)

OTHER PUBLICATIONS

Extended European Search Report issued in connection with corresponding EP Application No. 20216020.6 dated Jun. 7, 2021.

*Primary Examiner* — Reginald Alexander
(74) *Attorney, Agent, or Firm* — Maschoff Brennan

(57) ABSTRACT

A mixing apparatus includes an inner container and an outer container which define mixing fluid passageways between them. The inner container is received in the outer container with at least two different orientations. Each orientation forms a different set of passageways each including a mixing chamber and a riser passage, where the passageways lead from the inner container to the mixing chamber. The different orientations create different designs of the passageways, to give different mixing functionality.

15 Claims, 7 Drawing Sheets

(51) Int. Cl.
*B01F 23/2326* (2022.01)
*B01F 23/235* (2022.01)

(58) Field of Classification Search
CPC .......... B01F 23/232311; B01F 23/2323; B01F 23/23121
See application file for complete search history.

(56) References Cited

U.S. PATENT DOCUMENTS

| | | | |
|---|---|---|---|
| 2012/0118164 A1* | 5/2012 | Tonelli | B08B 9/0325 |
| | | | 99/280 |
| 2014/0327162 A1 | 11/2014 | Aeberhard et al. | |
| 2021/0076870 A1* | 3/2021 | Savioz | A47J 31/4485 |

FOREIGN PATENT DOCUMENTS

| | | |
|---|---|---|
| CN | 111565609 A | 8/2020 |
| EP | 3505023 A1 | 7/2019 |
| EP | 3735874 A1 | 11/2020 |
| WO | 2017158520 A1 | 9/2017 |
| WO | 2018060191 A1 | 4/2018 |
| WO | 2019129515 A1 | 7/2019 |
| WO | 2019129599 A1 | 7/2019 |
| WO | 2020224940 A1 | 11/2020 |

* cited by examiner

MIXING APPARATUS FOR EXAMPLE CREATING FROTHED MILK

CROSS-REFERENCE TO RELATED APPLICATIONS

The present application is a U.S. National Phase application under 35 U.S.C. § 371 of International Application No. PCT/EP2021/086145, filed on Dec. 16, 2021, which claims the benefit of European Patent Application No. 20216020.6, filed on Dec. 21, 2020. This application is hereby incorporated by reference herein.

FIELD OF THE INVENTION

This invention relates to mixing apparatus for mixing two fluids. Particularly, but not exclusively, the invention relates to the field of beverage preparation, and more specifically to the field of automatic frothed milk beverage preparation.

BACKGROUND OF THE INVENTION

Typically, full automatic espresso appliances provide the function of automated cappuccino brewing, in which coffee is brewed, and frothed milk is prepared. In most cases, steam is used for heating and frothing the milk, in a similar manner to a barista. To improve the ease of use of the appliance and provide stable performance to all users regardless of skill, several milk frothing modules have been developed. Normally, these modules are removable from the base appliance, as all parts in contact with milk need to be cleaned.

The milk frothing function typically operates by heating up water in a thermoblock within the coffee machine to generate steam, which then passes to the milk frothing unit. The frothed milk is used for milk recipes generally, and a cappuccino is one example.

One design of milk frothing unit comprises an internal milk container and an external part. When they are coupled together, a set of passageways is defined, including a riser passage along which milk from the inside of the milk container is drawn, up to a mixing chamber. In the mixing chamber, the milk is mixed with steam which has been delivered to the milk frothing unit from an external inlet. The steam is used for heating, and it may also be mixed with air for frothing.

This type of milk frothing unit is for example described in each of WO2019/129599 and WO 2019/129515.

The design of the milk, steam and air passageways, and flow restrictions within those passageways, determines the milk frothing functionality.

However, different users may have different preferences, or different types of milk froth may be desired for different types of drink. More generally, different mixing characteristics are desired for different use cases.

It would be desirable to enable the user to have control over the frothing performance, or more generally mixing characteristics, without requiring multiple parts.

SUMMARY OF THE INVENTION

The invention is defined by the claims.

According to examples in accordance with an aspect of the invention, there is provided a mixing apparatus comprising:

a first, inner, container for containing a first fluid comprising a liquid;
a second, outer, container for receiving the first container;
an external entry port for a second fluid at a fixed position relative to the second container; and
passageways defined between the first and second containers,
wherein the first container is configured to be received by the second container with a selected one of at least two different orientations,
wherein the passageways comprise:
when in the first orientation, a first set of passageways comprising: a first mixing chamber for mixing at least the first fluid and the second fluid, a first inlet channel which leads from the external entry port to the first mixing chamber and a first riser passage which leads from the first container to the first mixing chamber; and
when in the second orientation, a second set of passageways comprising a second mixing chamber for mixing at least the first fluid and the second fluid; a second inlet channel which leads from the external entry port to the second mixing chamber; and a second riser passage which leads from the first container to the second mixing chamber.

In this mixing apparatus, two possible sets of passageways are defined, depending on the orientation with which the first container is mounted into the second container. Each set of passageways provides mixing of the liquid in the first, inner, container with a fluid (i.e. liquid or gas) provided to the external entry port of the second container. The liquid rises up a riser passage to a mixer chamber.

By providing different possible sets of passageways, different mixing characteristics may be obtained, for example for mixing different pairs of fluids or for mixing the same pair of fluids but in a different ratio, or mixing with different other properties such as the amount of mixing with air for creating a foam.

The sets of passageways may be for mixing milk and steam. Alternatively, the externally introduced fluid may be water, and the mixing apparatus mixes a first liquid in the container with water, for example to dilute and heat the first liquid.

The different sets of passageways for example have different passageway dimensions and/or different flow restrictions. Flow restrictions are for example used to tune the flow rates through the different passages, and these can be tuned differently in the different sets of passageways.

The mixing chamber is basically a volume where the fluid and liquid meet, before being provided as an output from the apparatus.

There may be exactly two sets of passageways, but there may be more. For example, a square (from above) first, inner, container may enable four different passageway designs to be defined.

The first container may comprise a set of outer walls, wherein:
in the first orientation, the first set of passageways is defined between an inner wall of the second container and a first outer wall of the first container; and
in the second orientation, the second set of passageways is defined between the same inner wall of the second container and a second outer wall of the first container.

Thus, one wall of the second, outer, container is provided to define both sets of passageways, whereas different walls of the first, inner, container are used to define the different sets of passageways.

The first container may comprise a first opening between an inner volume of the first container and the first riser passage and a second opening between the inner volume of the first container and the second riser passage.

Each opening allows the passage of the liquid into the associated riser passage. By having only one opening in use, the liquid can only reach the riser passage that is in use.

A closing member may be provided for closing one of the first and second openings in dependence on the orientation.

Thus, the riser passage that is not in use is isolated from the contents of the first, inner, container.

A locking arrangement is for example provided for locking the first container to the second container. The locking position provides the required interaction between the two containers to define the first or second set of passageways in a sealed manner.

In one type of design, the locking arrangement may comprise the closing member for closing of one of the first and second openings in dependence on the orientation. Thus, the closing of an opening is an automatic part of coupling the first and second containers together.

In one arrangement, the locking arrangement comprises a rotary shaft for displacing the first container laterally into the second container and a head for driving the shaft, wherein the head is also for closing one of the first and second openings which is located at the open side. The rotary coupling enables lateral coupling of the two containers, as well as closing the unused opening.

In an alternative type of design, the first container comprises a first valve for the first opening and a second valve for the second opening, and the second container comprise a valve actuator for opening one of the valves such that the other valve functions as the closing member. Thus, in this case, on opening is opened by pushing open a valve, and the other remains closed.

In all examples, the first container may have a first, upright axis, and the first and second orientations are at 90 degrees with respect to each other about the first axis. This enables two adjacent sides of the first, inner, container which may have channels in them to be covered by the second container. This still enables the first, inner, container to be a lateral sliding fit into the second, outer, container.

Instead, the first container may have a first, upright axis, and the first and second orientations are at 180 degrees with respect to each other about the first axis. This enables only a single location to be needed for sealing the unused opening leading to the unused riser passage.

The second container may have at least one open side so that the first container is received as a lateral sliding fit into the second container through the open side. This is one way to couple the two containers together. An alternative is for one to be slid into the other from above.

As mentioned above, the apparatus may be used for mixing various fluids, generally for beverage preparation. In one example, the first container is for containing milk and the external entry port is for steam, and at least one of the first and second mixing chambers is for mixing milk, steam and air.

The apparatus is for example a milk frothing unit for a coffee maker such as an espresso machine.

The apparatus may further comprise a first air passage which leads to the first mixing chamber in the first orientation and a second air passage which leads to the second mixing chamber in the second orientation. The air passage is used for frothing, in addition to the heating provided by steam.

The apparatus is for example adapted to provide different milk frothing characteristics in the first and second orientations. Thus, a user can select the characteristics of the milk froth by selecting an orientation of the first, inner, container relative to the second, outer, container. The different frothing characteristics may for instance be different temperatures or different percentage of foam.

The apparatus may be adapted to provide different flow rates of milk along the first and second riser passages. This may be achieved with different passageway dimensions and/or different flow restriction dimensions.

The invention also provides a coffee machine comprising;
a liquid coffee extraction apparatus;
the apparatus as defined above; and
a dispenser adapted to dispense:
    liquid coffee from the liquid coffee extraction apparatus; and
    frothed milk from the mixing apparatus.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a mixing apparatus comprising inner and outer containers which define mixing fluid passageways between them. The inner container can be received in the outer container with at least two different orientations. Each orientation forms a different set of passageways each including a mixing chamber and a riser passage which leads from the inner container to the mixing chamber. The different orientations create different designs of the passageways, to give different mixing functionality.

The mixing apparatus may be used for mixing any two fluid flows (one being liquid from the inner container). The mixing may be for the purposes of heating and/or for the purpose of dilution and/or for the purpose of frothing (or foaming) It is of primary interest for preparation of beverages or liquid food, such as heated milk, tea, soup, hot chocolate etc.

In one example of particular interest, the mixing apparatus is a milk frothing unit for receiving steam delivered to it by an espresso coffee machine.

Figure 1A:
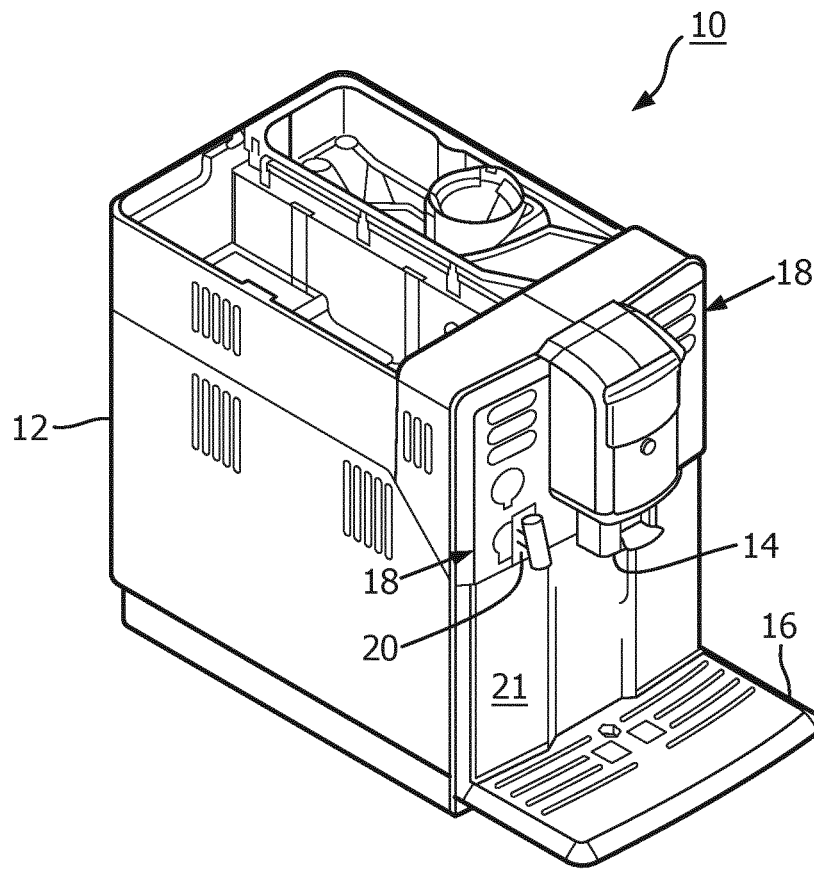
FIGS. 1A and 1B show two views of a drinks machine.
Figure 1B:
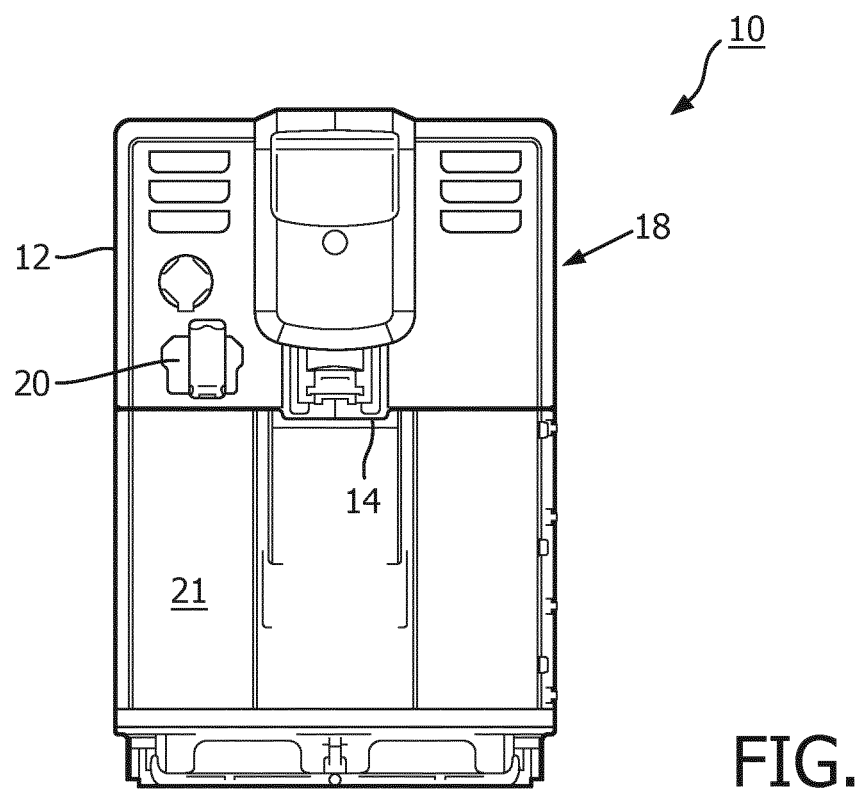

FIGS. 1A and 1B show am example of an espresso coffee machine 10. FIG. 1A shows a perspective view and FIG. 1B shows a view from in front. This example is a bean-to-cup machine, although other options are possible.

It comprises a main body 12 which houses a water reservoir, a water heater and a reservoir for receiving coffee beans. There is an internal grinding mechanism for creating coffee grind, a brewing chamber or brew group for receiving the coffee grind, and a pumping system for pumping heated water through the coffee grind.

The machine comprises a coffee output 14 from which the espresso drink (without milk) is output. The coffee output 14 faces downwardly and is located over a drip tray 16. FIGS. 1A and 1B also show a user interface 18 for receiving user selections, such as for water selection and for other drinks selections. At least some of the drinks selections relate to drinks recipes which include frothed milk and therefore require the generation of steam. There may also be an option for the generation of steam without being part of a drink selection, for example to enable the user to generate heated and/or frothed milk independently of any drink to be made by the machine.

The operation of the machine in generating an espresso coffee drink is entirely conventional, and the general operation of the coffee machine will not be described further. Furthermore, the illustrated full function espresso machine is only one example of the type of coffee machine to which the invention may be applied.

An output nozzle 20 is provided for delivering steam for milk frothing or hot water, depending on user selection at the user interface 18. The steam output may be used for heating and/or frothing milk, and the option of a hot water only output gives additional options to the user, for example for making soup, tea, hot chocolate etc. It is noted that instead of a single nozzle, there may be separate nozzles for steam and for hot water (not shown).

The output nozzle 20 is located in a docking region 21 for receiving a drinks vessel or a milk frothing unit.

The invention relates to a mixing apparatus, for example for creating frothed milk. It may for example be a modification to the mixing apparatus as disclosed in WO 2019/129599 and WO 2019/129515, although the invention has more general applicability.

Figure 2A:
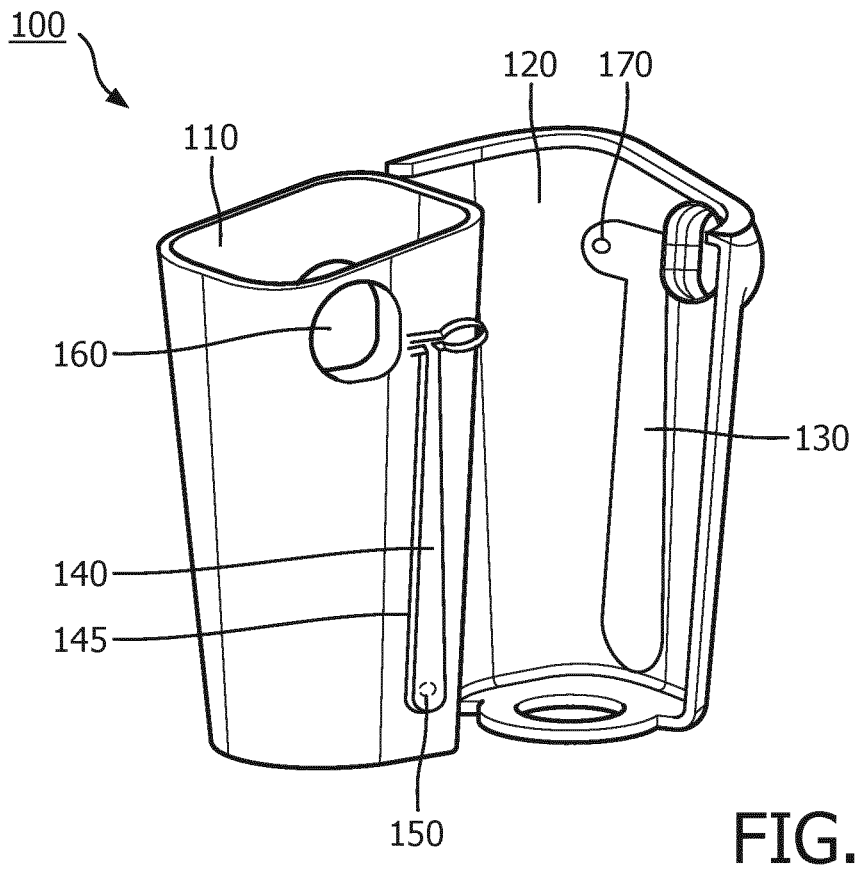
FIG. 2A shows an exploded view of an example mixing apparatus.

FIG. 2A shows a mixing apparatus 100 as disclosed in WO 2019/129599 and WO 2019/129515. The mixing apparatus comprises: a first, inner, container 110; a second, outer, container 120, adapted to receive the first, inner container; and a seal 130 disposed between the first and second containers.

The seal is for example a press fit into a side wall of one of the two containers so that when the two containers are assembled, the seal is sandwiched between them. The mating between the seal and one of the containers forms a closed channel arrangement which defines the fluid paths for milk and steam. By separating the two containers all parts can be easily cleaned. The seal may be a single seal or may be formed of different parts. The seal may be two shot (2K) molded into the second container, or else it may be a separate seal which is removable from a recess in the second container.

The mixing apparatus comprises a channel arrangement 140, which is defined by the seal 130 and the first container 110 when the mixing apparatus is assembled. In the example shown in FIG. 2A, the first container 110 comprises a raised channel portion 145, which further defines the channel arrangement. The channel arrangement connects a first port 150 at the bottom of the first container and a mixing chamber 160 near the top of the first container. In addition, the second container comprises an external entry port 175 (see FIG. 2B) connected to a first seal port 170 provided in the seal 130. The channel arrangement 140 further connects the first seal port 170 to the first port 150 and the mixing chamber 160.

Figure 2B:
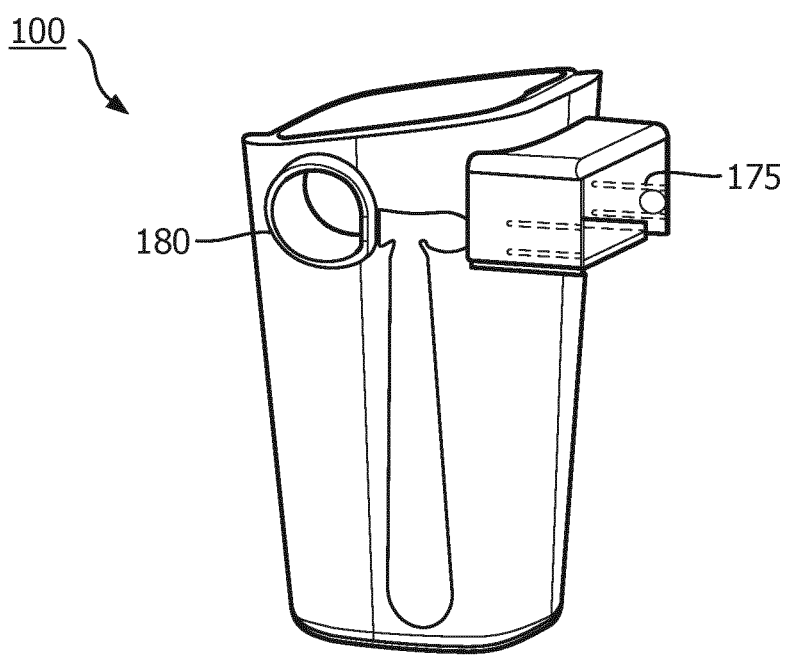
FIG. 2B shows an assembled view of the mixing apparatus of FIG. 2A.

FIG. 2B shows the mixing apparatus 100 of FIG. 2A in an assembled state.

In this Figure, it can be clearly seen that the second container 120 further comprises the external entry port 175 for receiving steam, for example from the espresso coffee machine. This steam is then provided to the first seal port 170. The second container further comprises a third port 180 that in assembled condition is connected to the mixing chamber 160 of the first container, thereby allowing the contents of the mixing chamber to be easily obtained from the mixing apparatus.

Figure 3A:
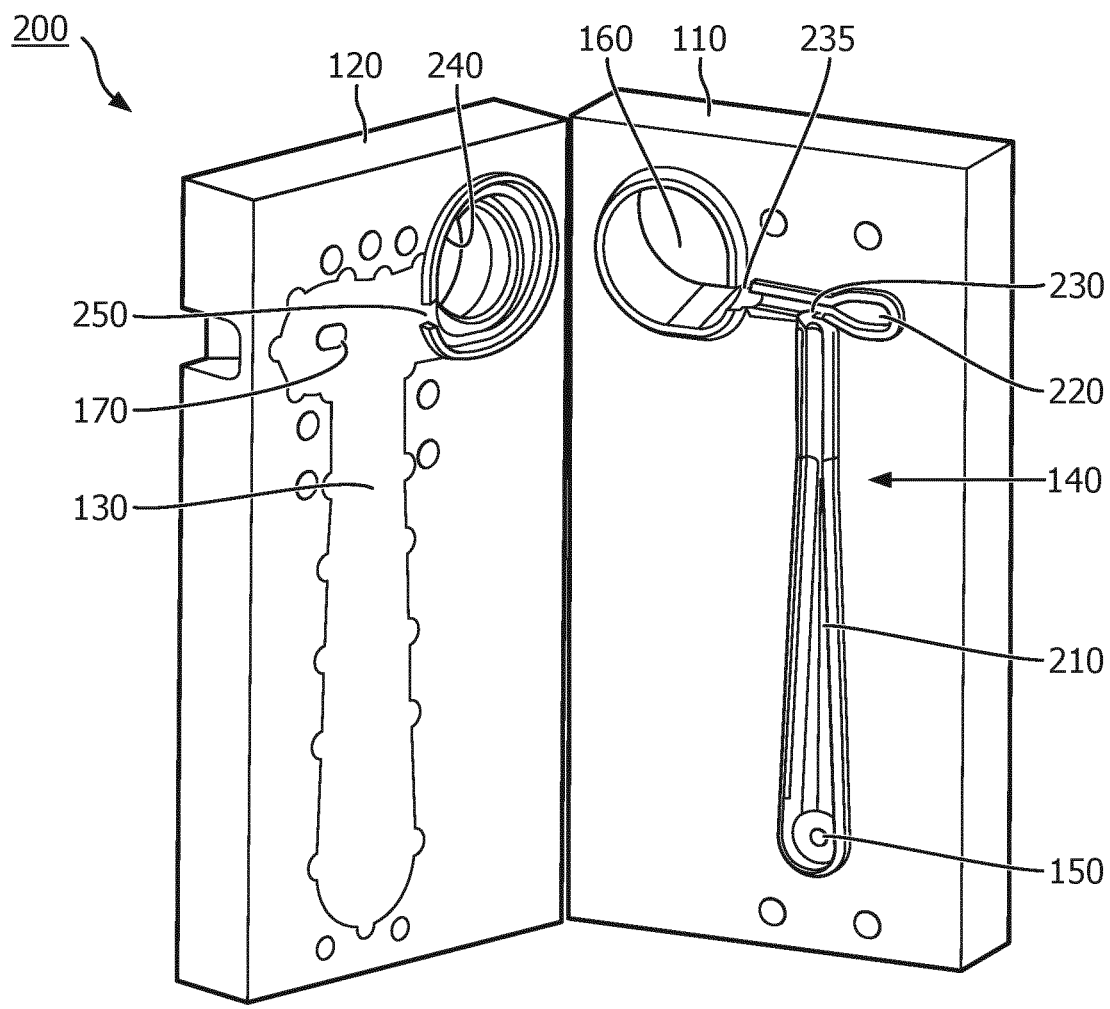
FIG. 3A shows a detailed view of the channel arrangement of the mixing apparatus of FIG. 2A.

The operation of the mixing apparatus is described with reference to FIG. 3A. FIG. 3A shows a detailed view 200 of the channel arrangement 140 of the mixing apparatus of FIG. 2A.

The channel arrangement 140 may be divided into several portions according to the operation performed by each portion. In operation, milk may be provided to the first container 110 and steam may be provided to the first seal port 170 (via external entry port 175). As steam enters the channel arrangement 140, milk 215 is drawn from the first container into a milk passage 210 (herein after also referred to as a first channel portion or riser passage 210) via the first port 150. The steam 225 enters a second channel portion 220 via first seal port 170 and then travels through a third channel portion 230 and into the mixing chamber 160. The flow of steam generates a negative pressure in the first channel portion 210 (i.e. the riser passage), thereby drawing the milk along the first channel portion 210.

The milk 215 is drawn along the first channel portion 210 until it meets the intersection of the three channel portions, where the flow of steam draws the milk and steam into the third channel portion 230 which terminates at an end 235 which opens into the mixing chamber 160. The third channel portion 230 may be adapted to impart a Venturi effect on the milk and steam as they pass through the third channel portion.

The steam is used to heat the milk and it operates the Venturi (i.e. a reduced pressure) to suck the milk up the first channel portion 210.

Air is introduced at the end point 235, by suction due to the flow speed. The introduced air provides bubbles for the desired frothing.

The Venturi effect may be achieved by simply restricting the cross sectional area of the third channel portion 230 relative to the first 210 and second 220 channel portions. The increase in speed of the milk and steam as they enter the third channel portion in combination with the drawing in of air defines the frothing performance of the mixing apparatus, and the pressure differential prevents the milk and steam from flowing down the incorrect channels.

The first channel portion 210 is typically vertical in use and extends up from the (milk entry) first port 150. At the top it meets the second channel portion 220 to one side which has a steam entry port at its remote end, and it meets the third channel portion 230 to the other side, which has the mixing chamber 160 at its remote end. In the illustrated embodiment, the channel arrangement 140 thus has a T-shape, and the seal 130 has a corresponding T-shape.

Figure 3B:
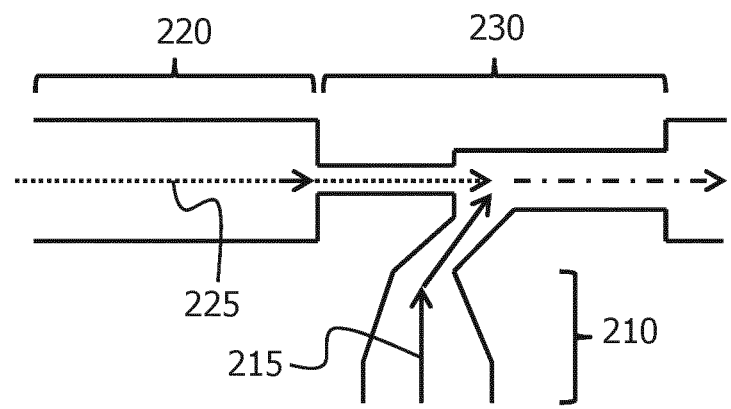
FIG. 3B shows the flow of fluid through the channel arrangement of FIG. 3A.

FIG. 3B shows a simple illustration of the intersection of the three channel portions.

As described above, the milk 215 flows along the first channel portion 210 due to the negative pressure generated by the steam 225 flowing from the second channel portion 220 to the third channel portion 230. As can be seen from the Figure, the channel widths are reduced as the milk and steam enter the third channel portion, thereby imparting a Venturi effect on the milk and steam flows, which is used to draw the milk along its channel.

Air is drawn in at the end 235 of the third channel portion 230 so that there is milk, steam and air mixture entering the mixing chamber. The aim of the mixing chamber is to release large bubbles and retain only small air bubbles in the mixture. The air, milk and steam mixture forms the fluid that enters the mixing chamber.

Figure 4:
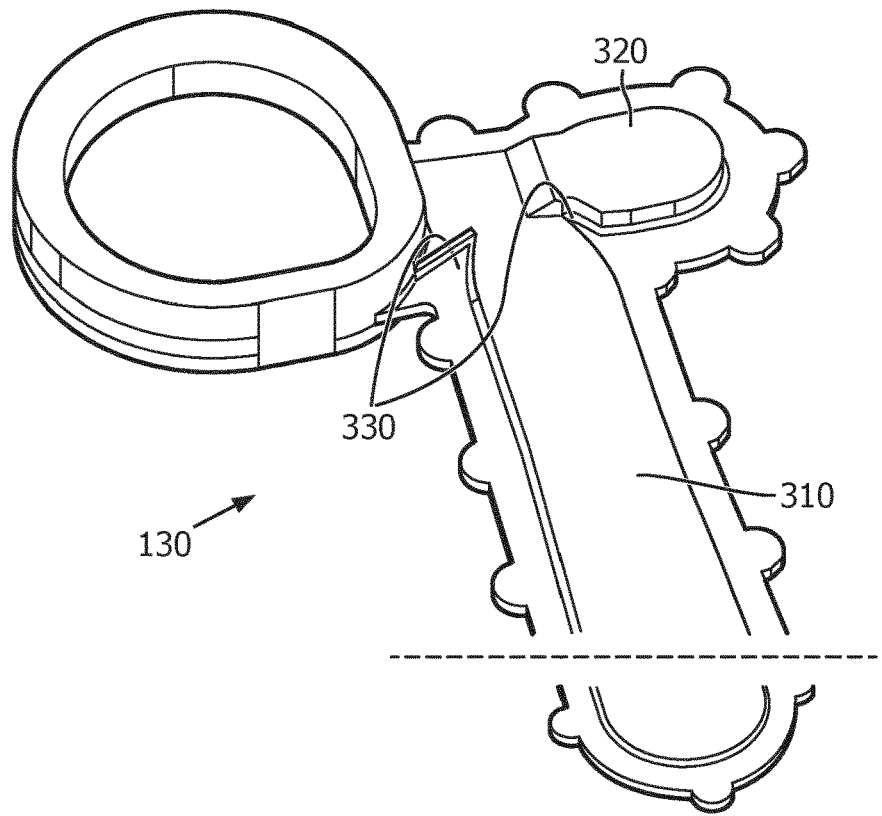
FIG. 4 shows an example design of the seal.

FIG. 4 shows the seal 130 of FIG. 3A in more detail.

The various channel portions undergo a variety of different conditions when the mixing apparatus 100 is in operation. The design of the channel portions and the seal thus influences the milk frothing function. This design includes the width, cross sectional area and length of the channel portions, and also any flow restrictions along the channel portions. In particular, the speed of the liquid (milk, steam and air) entering the mixing chamber influences the foam characteristics.

To the extent described above, the milk frothing apparatus is known. The invention provides a design which enables a user to select milk frothing characteristics, or more generally different mixing characteristics or functions (as the invention is not limited to a milk frothing device).

Figure 5:
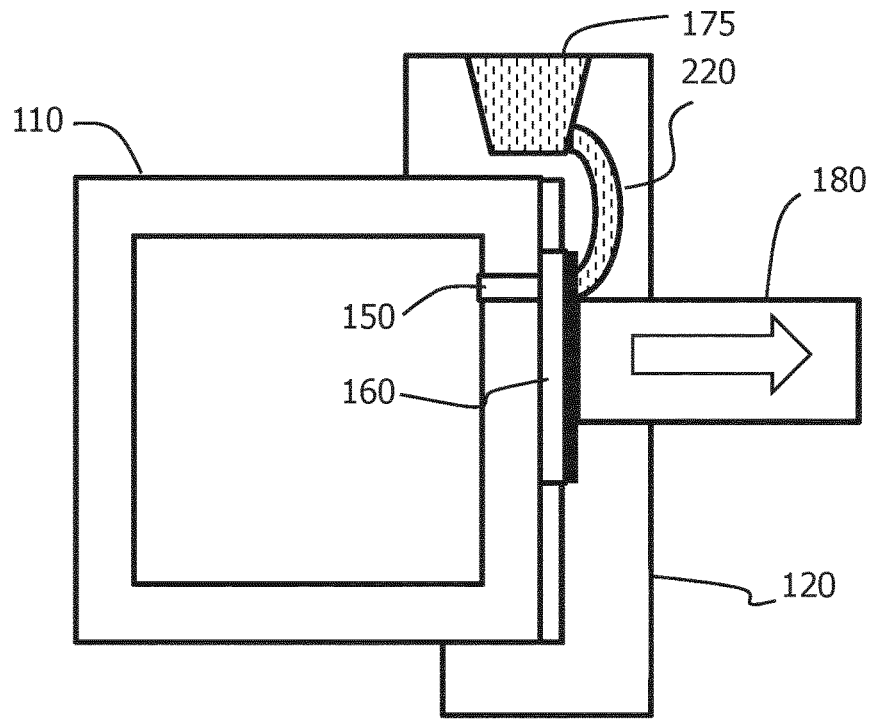
FIG. 5 shows in schematic plan view the known arrangement.

FIG. 5 shows in schematic plan view the arrangement described above, showing the first, inner, container 110 and the second, outer, container 120, and the first, second and third ports 150, 175, 180 as well as the mixing chamber 160. The first container is for receiving a first fluid, in particular a liquid, which is milk in this example.

The first port 150 will be termed "an opening" which leads to the first channel portion 210. This first channel portion will be termed a "riser passage". The second channel portion 220 will be termed an "inlet channel". The external entry port 175 is for receiving a second fluid at a fixed position relative to the second container 120.

In accordance with the invention, the first, inner, container 110 can be received in the second, outer, container 120 with at least two different orientations. Each orientation forms a different set of passageways each including its own mixing chamber and riser passage.

Figure 6:
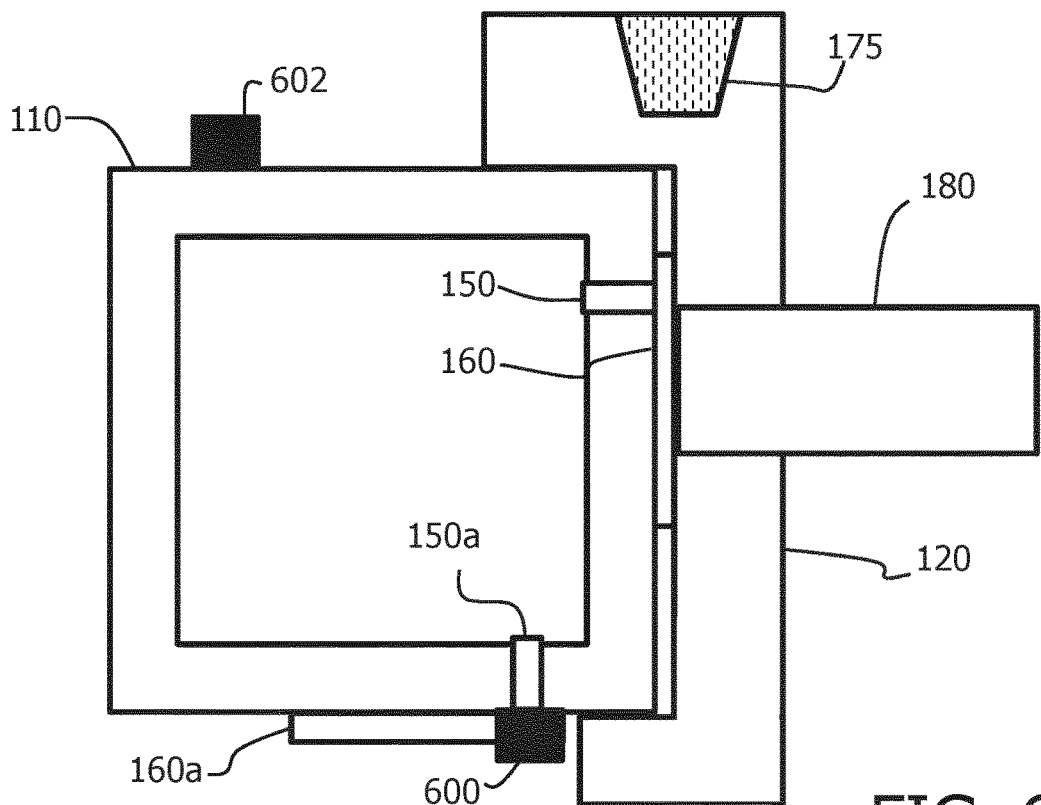
FIG. 6 shows a first example of an arrangement in accordance with the invention in plan view.

FIG. 6 shows a first example of an arrangement in accordance with the invention.

The first, inner, container 110 is schematically shown as square (when viewed from above), so that it can be rotated about a vertical axis into different orientations. For the example of two possible orientations, the two containers are preferably designed so that they only fit together with those two orientations.

The second, outer, container 120 has only one set of channel portions, whereas the first, inner, container has channel portions on two of its faces.

Thus, a first set of passageways can be formed, comprising a first opening 150, a first riser passage (not seen in plan view), a first inlet channel, and a first mixing chamber 160 when in the first orientation. There is also a second set of passageways which can be formed when in the second orientation, comprising a second opening 150a, a second riser passage (not seen in plan view), a second inlet channel, and a second mixing chamber 160a when in the second orientation.

Figure 7:
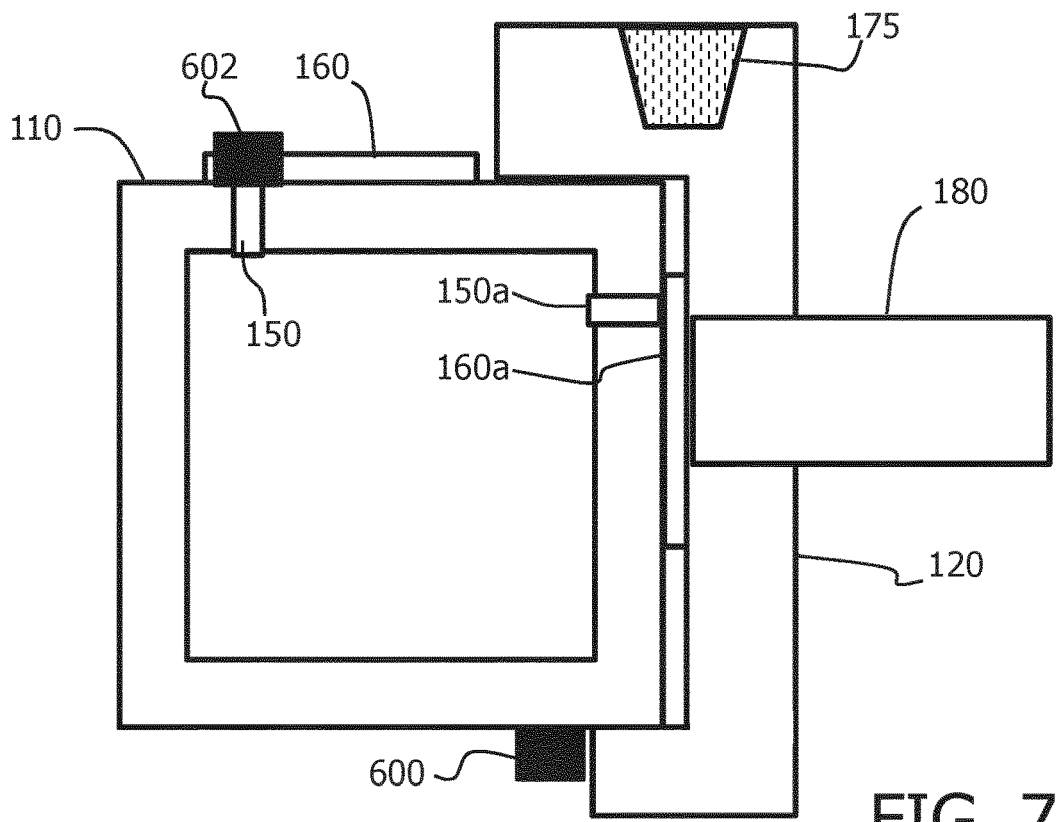
FIG. 7 shows the apparatus of FIG. 6 in a second orientation.

FIG. 6 shows the apparatus in the first orientation and FIG. 7 shows the apparatus in the second orientation in which the first, inner, container 110 is rotated by 90 degrees.

The opening (150 or 150a) that is not in use needs to be closed to prevent the contents of the first container leaking. FIG. 6 shows in schematic form first and second closing members 600, 602. One of them is used to close the one of the first and second openings that is not in use. Thus, the riser passage that is not in use is isolated from the contents of the first, inner, container 110. There are various ways to implement closure of the unused opening, as discussed further below.

In this mixing apparatus, two possible sets of passageways are defined, depending on the orientation with which the first container 110 is mounted into the second container 120. Each set of passageways provides mixing of the liquid in the first, inner, container with the fluid provided to the external entry port 175. The different sets of passageways may be for mixing different pairs of fluids. For instance, one set of passageways may be for mixing milk from the first container with steam delivered to the external entry port of the second container for heating purposes. The use of steam limits the dilution of the milk. The other set of passageways may be for delivering hot water to the external entry port for heating and dilution thus creating a different pair of fluids. Alternatively, cold water may be delivered to the external entry port 175 simply for dilution purposes.

The different sets of passageways for example have different passageway dimensions and/or different flow restrictions.

FIGS. 6 and 7 show an example in which the first container 110 has a first, upright axis, and the first and second orientations are at 90 degrees with respect to each other about the first axis. This enables two adjacent sides of the first, inner, container which have channels in them, to be covered by the second container by designing the second container to substantially enclose three sides of the first, inner, container (not shown). This hides the visible channels portions of the first container 110.

Figure 8:
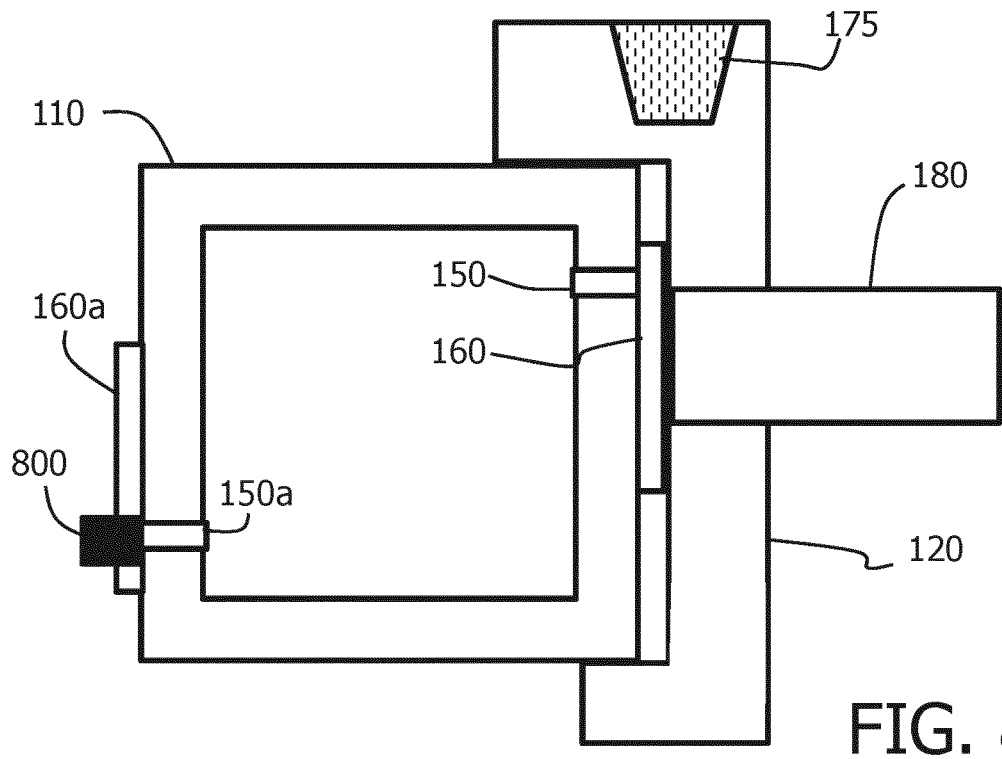
FIG. 8 shows a second example of an arrangement in accordance with the invention in plan view.

FIG. 8 shows an example in which the first container again has a first, upright axis, and the first and second orientations are at 180 degrees with respect to each other about the first axis. This enables only a single location to be needed for sealing the unused opening leading to the unused riser passage. Thus, a single closing member 800 is shown in FIG. 8.

The first container and second container lock together to ensure the passageways are correctly formed. The locking position provides the required interaction between the two containers to define the first or second set of passageways in a sealed manner.

Figure 9:
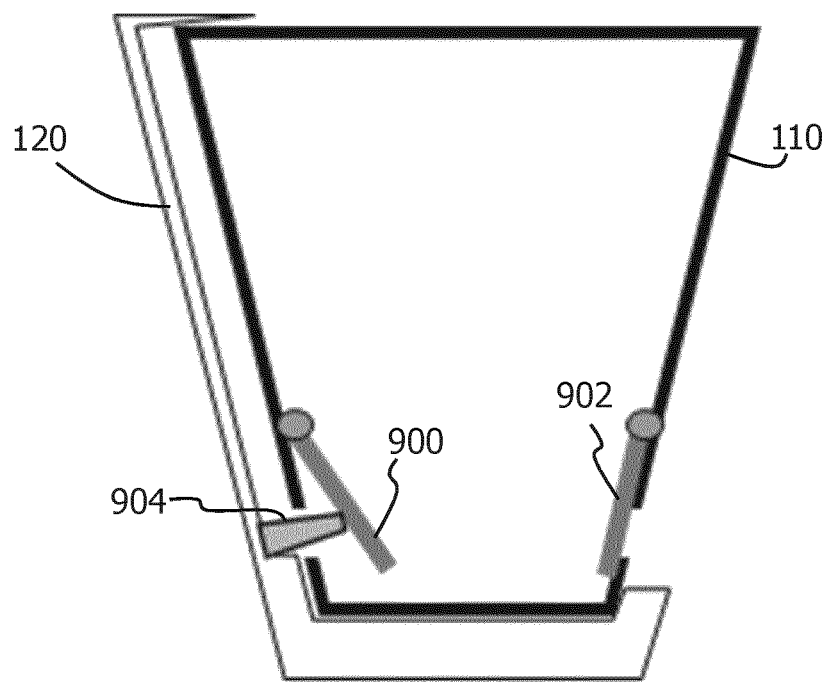
FIG. 9 shows a first example of how to implement closure of the unused opening.

FIG. 9 shows a first example of how to implement closure of the unused opening.

The first, inner, container 110 has a first valve 900 for the first opening and a second valve 902 for the second opening. These are normally closed. The second container 120 comprises a valve actuator 904 for opening one of the valves when the two containers are coupled together, while the other valve remains closed. This example is shown based on 180 degree rotation, but the same design may be applied to any angle of rotation.

The locking together of the two containers thus provides a valve opening function.

Figure 10:
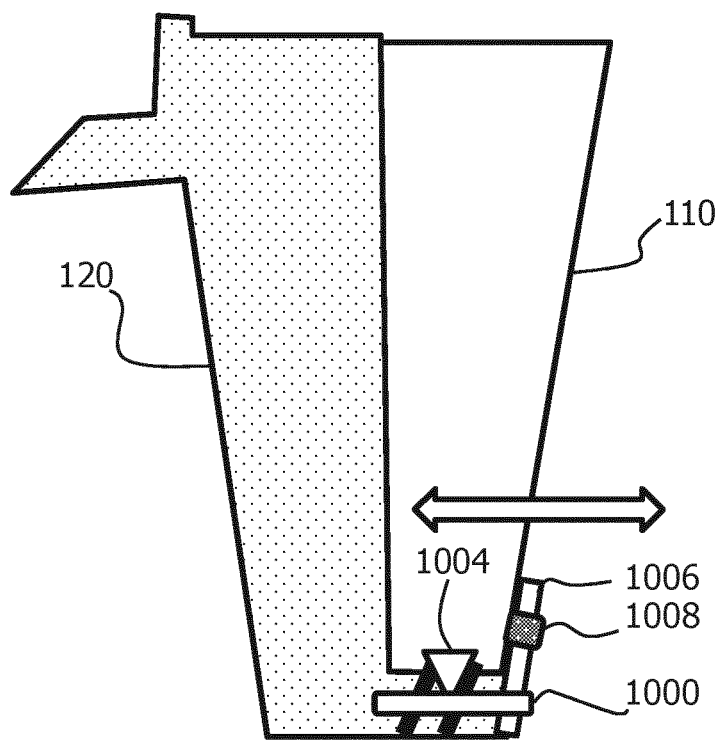
FIG. 10 shows a second example of how to implement closure of the unused opening viewed from a first side.

FIG. 10 shows a second example of how to implement closure of the unused opening. In this case, the locking together of the two containers provides a closing function for the unused opening.

The locking arrangement in this example comprises a rotary shaft 1000 for displacing the first container laterally into the second container. The shaft is part of the second container, and it has a thread 1002 which engages with a static thread 1004 of the first container. Thus, rotating the shaft brings the two containers together laterally. The shaft 1000 has a head 1006 for driving the shaft, and the head carries a seal 1008 for closing one of the first and second openings which is located at the open side. The rotary coupling enables lateral coupling of the two containers, as well as closing the unused opening.

Figure 11:
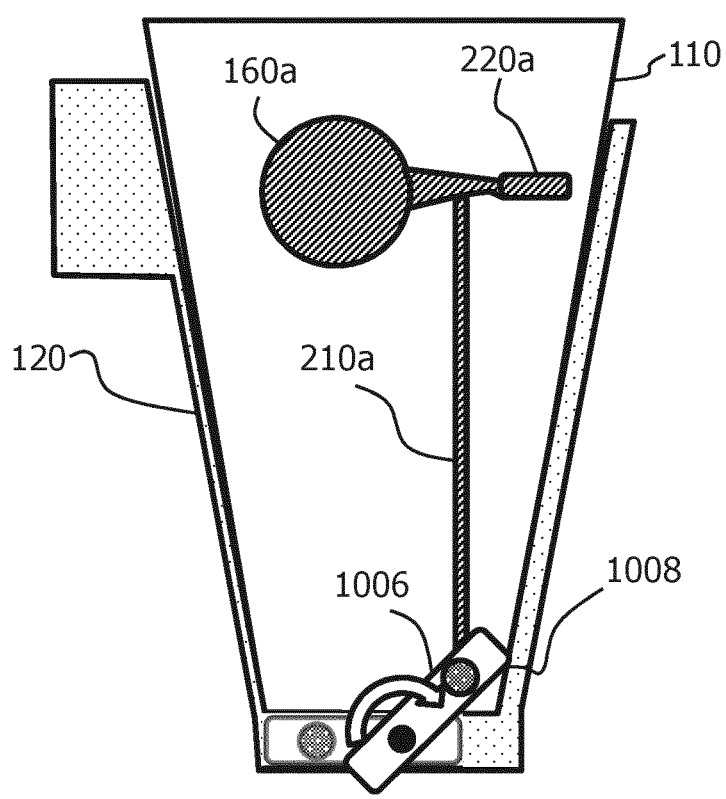
FIG. 11 shows the example of FIG. 10 viewed from a second side.

FIG. 11 shows the example of FIG. 10 viewed from the side of the first container where the unused channels are located. Thus, the second set of passageways can be seen, comprising the second mixing chamber 160*a*, the second inlet channel 220*a* and the second riser passage 210*a*. However, these passageways are not closed as they are not mated with the surface of the second container.

In the examples above, the second container 120 has at least one open side so that the first container is received as a lateral sliding fit into the second container through the open side. This is, however, only one way to couple the two containers together. An alternative is for one to be slid into the other from above.

As is clear from the discussion above, a milk frothing apparatus also includes an air passage. If frothing is implemented in both orientations, there will be a first air passage which leads to the first mixing chamber in the first orientation and a second air passage which leads to the second mixing chamber in the second orientation.

However, other mixing functions may not need the air passage. For example, a first orientation may be for mixing the first and second fluids and air, whereas a second orientation may be only for mixing the first and second fluids.

When two (or more) different frothing functions are provided, the differences may be achieved with different passageway dimensions and/or different flow restriction dimensions in any one or more of the milk, steam and air passageways.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mixing apparatus comprising:
   a first container for containing a first fluid comprising a liquid;
   a second container for receiving the first container;
   an external entry port for a second fluid at a fixed position relative to the second container; and
   passageways defined between the first container and the second container,
   wherein the first container is configured to be received by the second container with a selected one of at least two different orientations,
   wherein the passageways comprise:
      in a first orientation of the first container, a first set of passageways comprises a first mixing chamber for mixing at least the first fluid and the second fluid, a first inlet channel which leads from the external entry port to the first mixing chamber, and a first riser passage which leads from the first container to the first mixing chamber; and
      in a second orientation of the first container, a second set of passageways comprises a second mixing chamber for mixing at least the first fluid and the second fluid, a second inlet channel which leads from the external entry port to the second mixing chamber, and a second riser passage which leads from the first container to the second mixing chamber, wherein the second orientation is realised by a rotation of the first container about an axis.

2. The apparatus of claim 1, wherein the first container comprises a set of outer walls, wherein
   in the first orientation, the first set of passageways is defined between an inner wall of the second container and a first outer wall of the first container; and
   in the second orientation, the second set of passageways is defined between the inner wall of the second container and a second outer wall of the first container.

3. The apparatus of claim 1, wherein the first container comprises a first opening between an inner volume of the first container and the first riser passage, and a second opening between the inner volume of the first container and the second riser passage.

4. The apparatus of claim 3, comprising a closing member for closing one of the first opening and the second opening in dependence on the orientation.

5. The apparatus of claim 1, comprising a locking arrangement for locking the first container to the second container.

6. The apparatus of claim 4, wherein a locking arrangement comprises the closing member for closing one of the first opening and the second opening in dependence on the orientation.

7. The apparatus of claim 4, wherein the first container comprises a first valve for the first opening and a second valve for the second opening, and the second container comprise a valve actuator for opening one of the first valve and the second valve such that the valves function as the closing member.

8. The apparatus of claim 1, wherein the first container has the axis, and wherein the first orientation and the second orientation of the first container are at 90 degrees with respect to each other about the axis.

9. The apparatus of claim 1, wherein the first container has the axis, and wherein the first orientation and the second orientation of the first container are at 180 degrees with respect to each other about the axis.

10. The apparatus of claim 1, wherein the second container has at least one open side so that the first container is received as a lateral sliding fit into the second container through the open side.

11. The apparatus of claim 1, wherein
    the first container is for containing milk and the external entry port is for steam; and
    at least one of the first mixing chamber and the second mixing chamber is for mixing the milk, the steam, and air.

12. The apparatus of claim 1, comprising a first air passage which leads to the first mixing chamber in the first orientation and a second air passage which leads to the second mixing chamber in the second orientation.

13. The apparatus of claim 1, wherein the apparatus is adapted to provide different milk frothing characteristics in the first orientation and the second orientation.

14. The apparatus of claim 1, wherein the apparatus is adapted to provide different flow rates of milk along the first riser passage and the second riser passage.

15. A coffee machine comprising:
   a liquid coffee extraction apparatus;
   the mixing apparatus of claim 1; and
   a dispenser adapted to dispense:
      liquid coffee from the liquid coffee extraction apparatus; and
      frothed milk from the mixing apparatus.

* * * * *